US009279597B1

(12) United States Patent
Lee

(10) Patent No.: US 9,279,597 B1
(45) Date of Patent: Mar. 8, 2016

(54) SELECTION OF ENVIRONMENTAL PROFILE BASED ON SYSTEM CONFIGURATION

(71) Applicant: Brocade Communications System, Inc., San Jose, CA (US)

(72) Inventor: Michael K. T. Lee, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

(21) Appl. No.: 14/452,110

(22) Filed: Aug. 5, 2014

Related U.S. Application Data

(60) Provisional application No. 61/902,610, filed on Nov. 11, 2013.

(51) Int. Cl.
*G06F 1/16* (2006.01)
*F24F 11/053* (2006.01)
*G05B 15/02* (2006.01)
*G06F 9/445* (2006.01)

(52) U.S. Cl.
CPC .............. *F24F 11/053* (2013.01); *G05B 15/02* (2013.01); *G06F 9/44505* (2013.01)

(58) Field of Classification Search
USPC ........ 312/223.1, 236, 223.2, 223.3, 331, 216, 312/333; 361/679.53, 679.46, 679.39, 361/679.33, 679.47, 679.02, 679.48, 361/679.32, 679.31, 679.22, 679.54, 361/679.49, 679.01, 679.4, 679.37, 679.52, 361/679.45, 679.5, 679.51; 165/104.21, 165/104.23, 47, 104.26, 104.31, 104.33, 165/80.3, 80.2, 121, 185, 200, 247, 294; 345/179, 173, 158, 166, 30, 204, 34; 454/184, 187
See application file for complete search history.

(56) References Cited

U.S. PATENT DOCUMENTS

| 5,687,079 | A | 11/1997 | Bauer et al. |
| 7,426,109 | B2 | 9/2008 | Lindell et al. |
| 7,457,718 | B2 | 11/2008 | Gaskins |
| 7,490,017 | B2 | 2/2009 | Aguilar et al. |
| 7,493,235 | B2 | 2/2009 | Artman et al. |
| 7,520,669 | B2 | 4/2009 | Yazawa et al. |
| 7,574,321 | B2 | 8/2009 | Kernahan et al. |
| 7,725,285 | B2 | 5/2010 | Dhanekula et al. |

(Continued)

OTHER PUBLICATIONS

Ramkumar Jayaseelan; Application-Specific Thermal Management of Computer Systems; National University of Singapore 2009; B.E., Computer Science Engineering, College of Engineering Guindy, Anna University; A Thesis Submitted for the Degree of Doctor of Philosophy Department of Computer Science National University of Singapore, 2009; 189 pages.

*Primary Examiner* — Hung Duong
(74) *Attorney, Agent, or Firm* — Conley Rose, P.C.

(57) ABSTRACT

Method and apparatus provide for cooling a system. For example, a network communication system may include a central processing unit (CPU) and a fan controller. A chassis includes a plurality of receiving portions, each portion configured to receive a field replaceable unit (FRU). The chassis may also include a fan and a temperature sensor. The system CPU is configured to load a plurality of environmental profiles into fan controller memory, each profile indicating a fan speed for the fan based on a temperature reading from the temperature sensor. The fan controller is to determine a first configuration of the network communication device as to which FRUs are installed in the chassis and to select an environmental profile from the fan controller memory to use based on the determined first configuration.

12 Claims, 2 Drawing Sheets

(56) References Cited

U.S. PATENT DOCUMENTS

| | | |
|---|---|---|
| 7,726,144 B2 | 6/2010 | Larson et al. |
| 7,756,666 B2 | 7/2010 | Aguilar, Jr. et al. |
| 8,223,025 B2 | 7/2012 | Stiver et al. |
| 2009/0290625 A1 | 11/2009 | Riddle et al. |
| 2011/0103010 A1* | 5/2011 | Zhang ..................... G06F 1/186 361/679.49 |
| 2012/0215359 A1 | 8/2012 | Michael et al. |
| 2012/0253544 A1 | 10/2012 | Lu |
| 2014/0362525 A1* | 12/2014 | Zhou ........................ G06F 1/20 361/679.47 |

* cited by examiner

SELECTION OF ENVIRONMENTAL PROFILE BASED ON SYSTEM CONFIGURATION

CROSS-REFERENCE TO RELATED APPLICATION

The present application claims priority to U.S. Provisional Patent Application No. 61/902,610, filed Nov. 11, 2013, titled "Dynamic Environmental Monitoring With Offload Engine Method," which is hereby incorporated herein by reference in its entirety.

BACKGROUND

Many types of electronic systems have one or more fans to help cool the electronic devices. Temperature sensors included in the systems are used to obtain the temperature readings. The system adjusts the fan speed based on the temperature readings. As the system temperature increases, fan speed is set to a higher speed to keep all electronic devices operate within their specifications. Fan speed thus is a function of temperature.

Some systems have a static environmental policy which remains fixed during runtime. In a static environmental policy method, the electronic system's central processing unit (CPU) constantly polls temperature sensors and sets the proper fan speeds based on the sensed temperature. While a static method is simple to implement, a static method may be inadequate for electronic systems whose configurations are not static. Some electronic systems may be capable of accepting additional field replaceable units (FRUs) during runtime, or existing FRUs may be removed during runtime. The ability to add and/or remove FRUs during run-time may change the thermal characteristics of the system. The system software must be constantly upgraded to support new FRUs. As the types of new FRUs increase or system operating ranges change, the FRU combination complexity and thermal policy can grow exponentially. As the overhead of CPU housekeeping tasks increases, the CPU's main job to control the main operations of the system (e.g., a network switch) will be impaired and cause overall system performance degradation.

SUMMARY

Method and apparatus provide for cooling a system. For example, a network communication system may include a central processing unit (CPU) and a fan controller. A chassis includes a plurality of receiving portions, each portion configured to receive a field replaceable unit (FRU). The chassis may also include a fan and a temperature sensor. The system CPU is configured to load a plurality of environmental profiles into fan controller memory, each profile indicating a fan speed for the fan based on a temperature reading from the temperature sensor. The fan controller is to determine a first configuration of the network communication device as to which FRUs are installed in the chassis and to select an environmental profile from the fan controller memory to use based on the determined first configuration.

Another embodiment is directed to a method that includes, during initialization of a network communication device, loading, by the system CPU, a plurality of environmental profiles into memory of a fan controller, each environmental profile indicating a fan speed based on a temperature reading from a temperature sensor. The method also includes determining, by the fan controller, the configuration of the network communication device by determining which field replaceable units (FRUs) are installed in the network communication device, and determining, by the fan controller, which of the plurality of the environmental profiles corresponds to the determined configuration. The method further includes controlling a fan, by the fan controller, using the environmental profile determined to correspond to the determined configuration.

Another embodiment includes a switch system may include a plurality of network ports, a central processing unit (CPU), a packet processor, and a fan controller. The switch also includes a chassis which includes a plurality of receiving portions, each portion configured to receive a field replaceable unit (FRU). The switch may also include a fan and a temperature sensor. During initialization of the network communication device, the system CPU is configured to load a plurality of environmental profiles into the registers, each profile defining fan speeds for the fans based on temperature readings from the temperature sensors. During initialization and during run-time, the fan controller is to periodically determine a configuration as to which FRUs are installed in the receiving portions and to select an environmental profile from the fan controller memory to use for cooling the switch based on a most recent determination of the configuration.

BRIEF DESCRIPTION OF THE DRAWINGS

For a detailed description of exemplary examples, reference will now be made to the accompanying drawings in which.

DETAILED DESCRIPTION

This disclosure is generally directed to a system, such as a network communication device, that includes a system CPU and a separate fan controller. Responsibility for determining the system's configuration and selecting an appropriate environmental to adequately cool the system based on the configuration is offloaded to the fan controller thereby reducing the operational burden on the system CPU.

Figure 1:
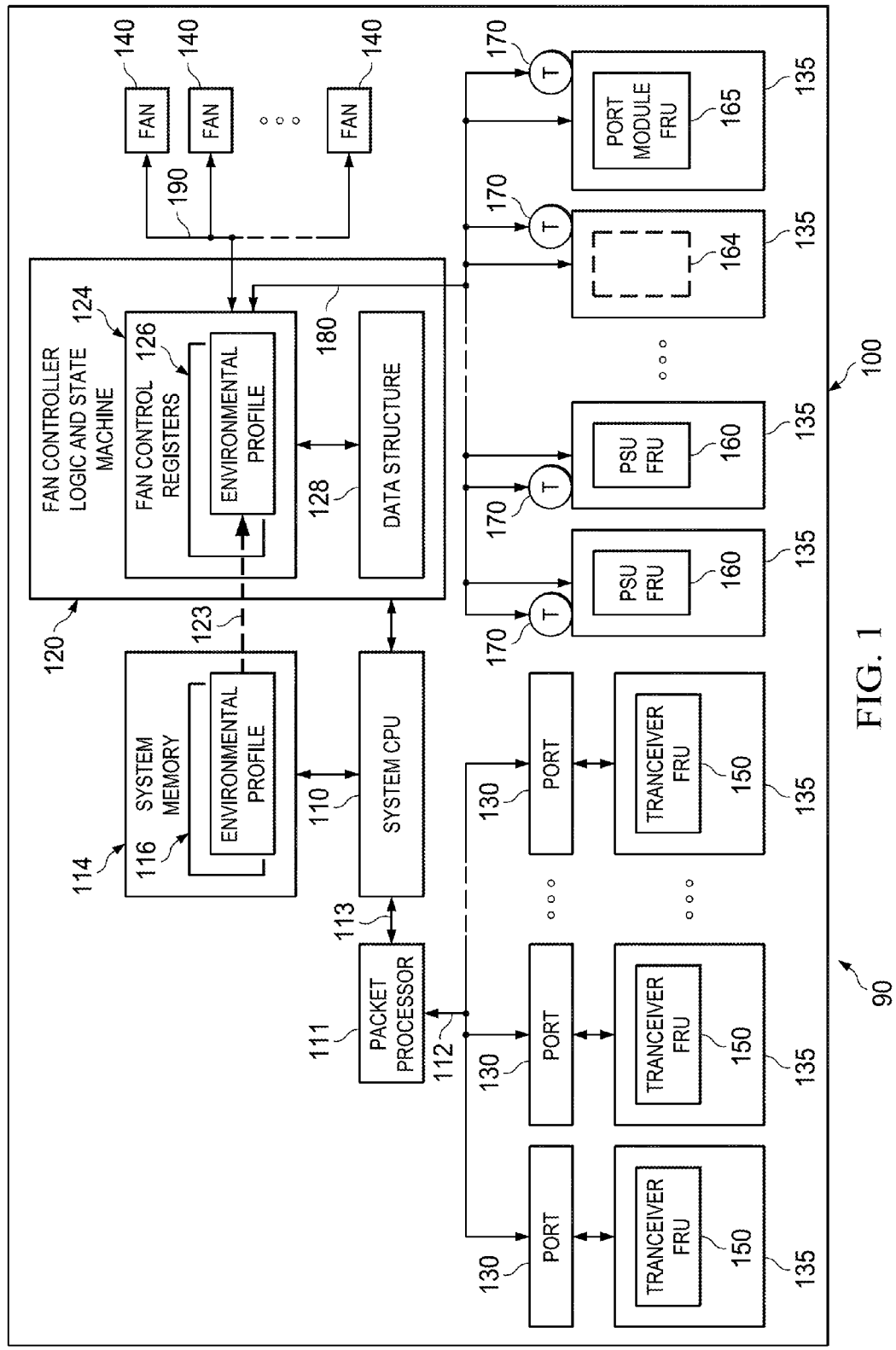
FIG. 1 shows an example of a system including field replaceable units in which any of multiple environmental profiles for controlling a fan are usable based on the system's configuration in accordance with the disclosed principles.

FIG. 1 shows an example of a system 90 such as a network communication device. Examples of network communication devices include switches, routers, and the like. The principles disclosed herein also may apply to devices other than network communication devices.

The example of FIG. 1 includes a chassis 100 which houses various components. The chassis 100 may include a system CPU 110 coupled to a fan controller 120. Memory 114 is included and is accessible by the system CPU 110. Register 124 is accessible by the fan controller and is referred to herein as fan controller register. Fan controller register 124 is internal to the fan controller 120 and it is directly accessible to the fan controller or CPU 110. For the example in which the system functions as a network communication device, a plurality of ports 130 is also provided. Each port 130 is configured to be connected to a device external to the system 90 using transceivers 150. Transceivers 150 can be optical or electrical. Examples of such external devices include end nodes and other network communication devices. Each port 130 may be configured to receive and/or transmit a packet of information. A packet processor 111 controls the flow of packets between the ports and interacts with CPU 110. For example, a packet received on one port 130 may be routed out through another one of the ports 130 and the determination as to how to route the packet is made by the packet processor 111. The packet processor 111 communicates with all ports 130 via a dedicated channel 112. The CPU 110 also communicates with packet processor 111 via bus 113.

The fan controller 120 may be implemented as a complex programmable logic device (CPLD), a field-programmable gate array, or other type of programmable device. The fan controller 120 is not the system CPU 110 and it does not have responsibility for controlling how packets flow through the various ports of system 90. In one example, the fan controller 120 is only responsible for the functions attributed to it in this disclosure.

Various receiving portions 135 are also provided in the chassis 100. Each receiving portion 135 is an electromechanical structure to receive a particular FRU (e.g., a connector, a card cage, etc.). Some receiving portions 135 receive transceiver FRUs 150 while other receiving portions 135 receive power supply unit (PSU) FRUs 160 and port module FRUs 165. Not every receiving portion 136 is necessarily populated as it is a FRU. One of the receiving portions 135 in FIG. 1 is shown devoid of an FRU (as indicated by dashed box 164). The particular types, number, and/or location of FRUs in system 90 provides the system with its "configuration." That is, a configuration for the system is defined by the particular set of FRUs that are installed in the chassis. Different chassis 100 may be populated with different sets of FRUs. The FRUs may be removed and/or installed in the chassis while the system 90 is powered off, or during runtime (hot pluggable). The configuration of the chassis changes as FRUs are added and/or removed.

The FRUs may be any type of component desired to be installed in system 90. The FRUs installed in a chassis may all be of the same type of component or may be a mix of different types of components. Examples of FRUs include port modules 165, memory cards, power supply units (PSU) 160, fan modules, transceivers 150, etc.

If fans are installed in the system, then such fans help to cool system 90. Some of the FRUs may also include a temperature sensor 170 and other temperatures 170 may be provided in the system 90. The temperature sensors help to monitor the temperature of the system 90. In the example of FIG. 1, a temperature sensor 170 is provided for each receiving portion 135, but the temperature sensors 170 can be arranged differently from that shown in FIG. 1.

The fan controller 120 may receive temperature readings from temperature sensors 170 via a bus 180 which, in some implementations may be a serial bus such as an Inter-Integrated Circuit (I²C) bus or a Serial Peripheral Interface (SPI) bus). Via the bus 180, or a different bus, the fan controller 120 may also communicate with each receiving portion 150 to determine whether an FRU is present in the receiving portion. Thus, the fan controller 120 can determine the configuration of the system by determining which FRUs are installed in the chassis 100. The fan controller 120 may determine the configuration of the system 90 during initialization of the system and/or at periodic intervals during runtime. Thus, as the configuration changes during runtime, the fan controller 120 is able to determine each such new configuration.

Figure 2:
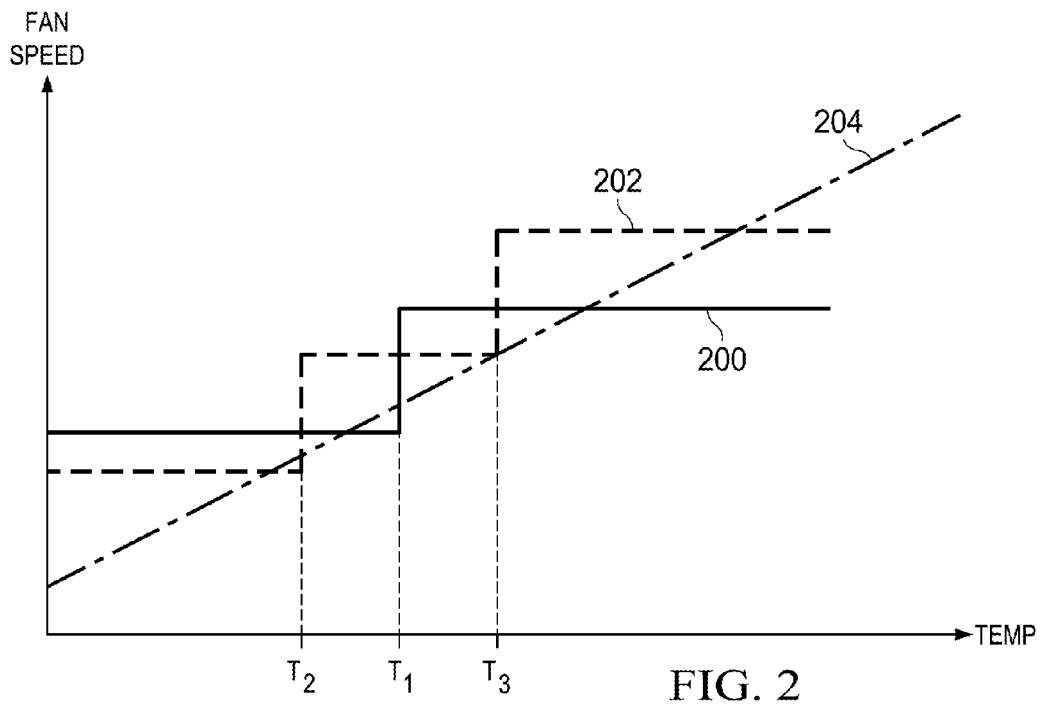
FIG. 2 shows various examples of environmental profiles in accordance with the disclosed principles.

The fans preferably are controlled according to various environmental profiles. An environmental profile indicates a fan speed for the fans based on a temperature reading from one or more of the temperature sensors 170. Examples of environmental profiles are illustrated in FIG. 2. Profile 200 implements two different fan speeds based on whether the temperature is below or above a threshold T1. Profile 202 is similar to profile 200 but implements two thresholds T2 and T3. As such, profile 202 causes the fans 140 to operate at one of three fan speeds-a lowest fan speed for a temperature reading below T2, an intermediate fan speed for a temperature reading between T2 and T3, and a higher fan speed for a temperature reading above T3. Profile 204 is a linear profile in which fan speed is computed based on a temperature reading according to a linear equation.

Referring again to FIG. 1, in accordance with the preferred embodiment, the system CPU's memory 114 contains a plurality of environmental profiles 116. Each profile 116 operates the fans to adequately cool the system 90 for a particular system configuration. In accordance with a preferred embodiment, and based on a configuration setting, during system initialization, the system CPU 110 offloads such responsibility to the fan controller 120. In such embodiments, the system CPU 110 loads the various environmental profiles 116 into the fan controller register 124 (illustrated in FIG. 1 as environmental profiles 126 with the loading process represented by dashed arrow 123). The fan controller 120 is responsible for determining the system's configuration and selecting an environmental profile 126 from fan controller memory 124 to use based on the determined configuration.

As such, the system CPU 110 loads the profiles into the fan controller register 124 and the fan controller 120 determines the system's configuration and uses the appropriate profile to cool the system. The system CPU 110 does not need to determine the configuration which advantageously reduces the operational burden on the system CPU 110 and frees the system CPU 110 to perform other actions such as checking the health and status of the system and ensuring packets are routed correctly between the ports 130.

Figure 3:
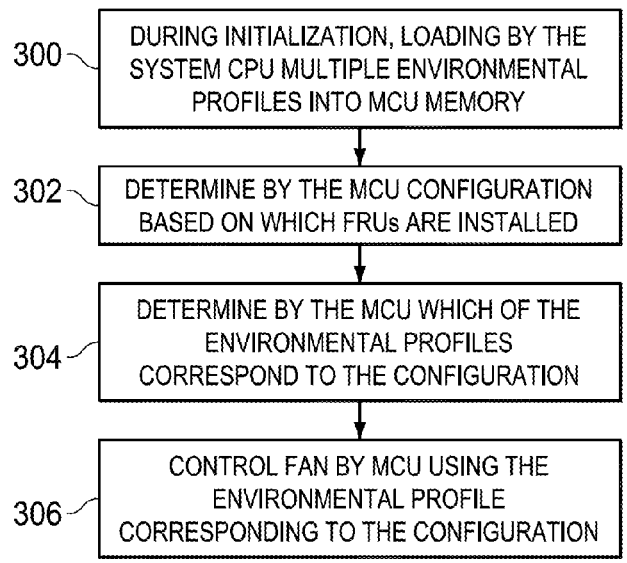
FIG. 3 shows a method of cooling the system in accordance with the disclosed principles.

FIG. 3 shows an example of a method for cooling the system 90. At 300, during initialization of the system 90, the method includes loading by the CPU 110 a plurality of environmental profiles into the fan controller register 124. As explained above, each environmental profile is indicative of a fan speed based on a temperature reading from a temperature sensor 170. All fans may be controlled to a common fan speed or the fans may be individually controlled to different fan speeds.

At 302, the method further includes determining by the fan controller 120 the configuration for the system based on which FRUs are installed in the chassis 100. This determination may be performed by the fan controller 120 attempting to interrogate each possibly installed FRU 160 via bus 180. If an FRU 160 is present in a given receiving portion 160, the FRU 160 reports information about the FRU. Such information may include such FRU name, type, power requirements, maximum rated temperature, etc. The fan controller 120 collects such information to determination the present system configuration, and then determines (304) which of the environmental profiles 126 in fan controller register 124 corresponds to the determination configuration. Table I below illustrates an example of a data structure 128 (FIG. 1) stored in fan controller memory 124 in which environmental profiles are mapped to system configurations.

TABLE I

| Environmental Profile | Configuration |
| --- | --- |
| EP1 | FRU1, FRU2, FRU7 |
| EP2 | FRU1, FRU2 |
| ... | |
| EPn | FRU3 |

The designations EP1, EP2, EPn correspond to predetermined environmental profiles, examples of which are illustrated in FIG. 2. The designations FRU1, FRU2, etc. may refer to which FRUs 160 are installed in the chassis. Each FRU designation in Table 1 may refer to a name, a type, or any other type of information about a given FRU 160. In the example of Table 1, environmental profile EP1 corresponds to a system configuration in which FRUs FRU1, FRU2 and FRU7 are installed in the chassis, while environmental profile EP2 corresponds to a system configuration in which FRU1 and FRU2 are installed in the chassis. Environmental profile EPn corresponds to a system configuration in which only one FRU (FRU3) is installed in the chassis. Once the fan controller 120 determines the present configuration for the system the fan controller may perform a look-up into data structure 128 (which may contain Table 1) to select the corresponding environmental profile.

At 306, once the fan controller 120 selects the environmental profile corresponding to the current system configuration, the fan controller controls fan speed using that profile. This operation may be performed by the fan controller loading the selected environmental profile 126 into different memory of the fan controller or into one or more registers internal to the fan controller. The fan controller then periodically polls the temperature sensors 170 and sets fan speed based on the newly received temperature reading(s).

As explained above, the fan controller 120 may determine during runtime (or system initialization) that the system configuration has changed (e.g., due to a hot insertion or removal event of an FRU). When this happens, the fan controller 120 may select and use a different environmental profile 126 from fan controller memory 124 based on a different environmental corresponding to the newly determined configuration (e.g., as determined from data structure 128).

It will be appreciated that numerous variations and/or modifications may be made to the above-described examples, without departing from the broad general scope of the present disclosure. The present examples are, therefore, to be considered in all respects as illustrative and not restrictive.

What is claimed is:

1. A network communication device, comprising:
   a system central processing unit (CPU);
   a fan controller coupled to the system CPU;
   a chassis including a plurality of receiving portions, each portion configured to receive a field replaceable unit (FRU);
   a fan; and
   a temperature sensor;
   wherein the system CPU is configured to load a plurality of environmental profiles into fan controller memory, each profile indicating a fan speed for the fan based on a temperature reading from the temperature sensor; and
   wherein the fan controller is to determine a first configuration of the network communication device as to which FRUs are installed in the chassis and to select an environmental profile from the fan controller memory to use based on the determined first configuration.

2. The network communication device of claim 1 further comprising a plurality of ports, and wherein the system CPU controls the flow of packets between the ports.

3. The network communication device of claim 1 wherein, during startup of the network communication device, the system CPU loads the plurality of environmental profiles into fan controller memory.

4. The network communication device of claim 1 wherein:
   during the startup of the network communication device, the fan controller is to determine the first configuration for the network communication device and to cause, from the fan controller memory, a first environmental profile corresponding to the first configuration to be used to cool the network communication device; and
   during runtime of the network communication device, the fan controller is to determine a second configuration for the network communication device as to which FRUs are installed in the chassis and to cause, from the fan controller memory, a second environmental profile corresponding to the second configuration to be used to cool the network communication device instead of the first environmental profile.

5. The network communication device of claim 1 wherein each of the plurality of environmental profiles corresponds to a different configuration of the network communication device based on different sets of FRUs installed in the chassis.

6. A method, comprising:
   during initialization of a network communication device, loading, by a system central processing unit (CPU), a plurality of environmental profiles into memory of a fan controller coupled to the system CPU, each environmental profile indicating a fan speed based on a temperature reading from a temperature sensor;
   determining, by the fan controller, the configuration of the network communication device by determining which field replaceable units (FRUs) are installed in the network communication device;
   determining, by the fan controller, which of the plurality of the environmental profiles corresponds to the determined configuration; and
   controlling a fan, by the fan controller, using the environmental profile determined to correspond to the determined configuration.

7. The method of claim 6 wherein determining the configuration of the network communication device occurs during the initialization.

8. The method of claim 7 wherein determining, by the fan controller, the configuration of the network communication device also occurs during the runtime of the network communication device, and wherein the method further comprises during runtime of the network communication device:
   determining, by the fan controller, a new configuration of the network communication device by determining which FRUs are installed in the network communication device;
   determining, by the fan controller, which of the plurality of the environmental profiles corresponds to the newly determined configuration; and
   changing control of the fan, by the fan controller, to a different environmental profile determined to correspond to the newly determined configuration.

9. A switch, comprising:
   a plurality of network ports through which packets are received into or transmitted from;
   a system central processing unit (CPU);
   a packet processor to control the routing of the packets from one port to another;
   a fan controller coupled to the system CPU;
   registers accessible to the fan controller;
   a chassis including a plurality of receiving portions, each portion configured to receive a field replaceable unit (FRU);
   a plurality of fans; and
   a plurality of temperature sensors;
   wherein, during initialization of the network communication device, the system CPU is configured to load a plurality of environmental profiles into the registers, each profile defining fan speeds for the fans based on temperature readings from the temperature sensors; and wherein, during initialization and during run-time, the fan controller is to periodically determine a configuration as to which FRUs are installed in the receiving portions and to select an environmental profile from the fan controller memory to use for cooling the switch based on a most recent determination of the configuration.

10. The switch of claim 9 further comprising a plurality of ports, and wherein the system CPU controls the flow of packets between the ports.

11. The switch of claim 9 wherein each of the plurality of environmental profiles corresponds to a different configuration of the network communication device based on different sets of FRUs installed in the chassis.

12. The switch of claim 9 wherein the fan controller is one of a field-programmable gate array or a complex programmable logic device.

* * * * *